United States Patent
Groleau

(10) Patent No.: US 10,632,843 B2
(45) Date of Patent: Apr. 28, 2020

(54) ASSISTANCE MODULE FOR THE STEERING WHEEL OF A VEHICLE

(71) Applicant: Autoliv Development AB, Vårgårda (SE)

(72) Inventor: Laurent Groleau, Quincay (FR)

(73) Assignee: Autoliv Development AB, Vargarda (SE)

(*) Notice: Subject to any disclaimer, the term of this patent is extended or adjusted under 35 U.S.C. 154(b) by 40 days.

(21) Appl. No.: 15/538,759

(22) PCT Filed: Dec. 16, 2015

(86) PCT No.: PCT/EP2015/080069
§ 371 (c)(1),
(2) Date: Jun. 22, 2017

(87) PCT Pub. No.: WO2016/102280
PCT Pub. Date: Jun. 30, 2016

(65) Prior Publication Data
US 2019/0009675 A1  Jan. 10, 2019

(30) Foreign Application Priority Data
Dec. 22, 2014 (FR) .................................. 14 63130

(51) Int. Cl.
*B60K 28/06* (2006.01)
*B60R 11/04* (2006.01)
(Continued)

(52) U.S. Cl.
CPC ............ *B60K 28/066* (2013.01); *B60K 28/06* (2013.01); *B60K 35/00* (2013.01); *B60K 37/04* (2013.01);
(Continued)

(58) Field of Classification Search
CPC .......... B60K 28/066; B60K 2350/1036; B60K 2350/203; B60K 2350/928;
(Continued)

(56) References Cited

U.S. PATENT DOCUMENTS 7,441,800 B2 * 10/2008 Weber .................... B62D 1/046
200/61.54
7,570,785 B2 * 8/2009 Breed .................. B60K 28/066
382/100
(Continued)

FOREIGN PATENT DOCUMENTS

DE    102004007253 B3    6/2005
EP        2695792 A2     2/2014
(Continued)

OTHER PUBLICATIONS

International Search Report for PCT/EP2015/080069, ISA/EP, Rijswijk, NL, dated Apr. 7, 2016, with English translation.
(Continued)

*Primary Examiner* — Thomas S McCormack
(74) *Attorney, Agent, or Firm* — Stephen T. Olson; Harness, Dickey & Pierce, P.L.C.

(57) ABSTRACT

A driver assistance module is designed to be fixed on an automobile steering wheel. The driver assistance module includes a first driver information device and an infrared radiation source arranged to illuminate the driver and forming part of a second information device.

9 Claims, 1 Drawing Sheet

(51) Int. Cl.
*B60Q 3/283* (2017.01)
*B60K 35/00* (2006.01)
*B60K 37/04* (2006.01)
*B60K 37/06* (2006.01)
*B60Q 3/14* (2017.01)
*B60R 11/00* (2006.01)

(52) U.S. Cl.
CPC ............... *B60K 37/06* (2013.01); *B60Q 3/14* (2017.02); *B60Q 3/283* (2017.02); *B60R 11/04* (2013.01); *B60K 2370/11* (2019.05); *B60K 2370/113* (2019.05); *B60K 2370/115* (2019.05); *B60K 2370/126* (2019.05); *B60K 2370/128* (2019.05); *B60K 2370/1442* (2019.05); *B60K 2370/1446* (2019.05); *B60K 2370/1468* (2019.05); *B60K 2370/21* (2019.05); *B60K 2370/33* (2019.05); *B60K 2370/332* (2019.05); *B60K 2370/48* (2019.05); *B60K 2370/774* (2019.05); *B60K 2370/782* (2019.05); *B60R 2011/001* (2013.01); *B60W 2420/403* (2013.01); *B60W 2540/22* (2013.01)

(58) Field of Classification Search
CPC ...... B60K 2350/1004; B60K 2350/102; B60K 2350/1032; B60K 2350/2013; B60K 2350/925; B60K 28/06; B60K 35/00; B60K 37/04; B60K 37/06; B60Q 3/283; B60Q 3/14; B60R 11/04; B60R 2011/001; B60W 2420/403; B60W 2540/22
USPC ....................................................... 340/576
See application file for complete search history.

(56) References Cited

U.S. PATENT DOCUMENTS

| | | |
|---|---|---|
| 2005/0189159 A1 | 9/2005 | Weber et al. |
| 2009/0040196 A1 | 2/2009 | Duckstein et al. |
| 2010/0288573 A1* | 11/2010 | Nishina .................. B60R 11/02 180/272 |
| 2012/0320151 A1* | 12/2012 | Unger .............. G08B 13/19628 348/37 |
| 2012/0326967 A1* | 12/2012 | Gohng ................... B60K 35/00 345/156 |
| 2014/0097957 A1* | 4/2014 | Breed .................... G08B 21/06 340/576 |
| 2014/0210625 A1* | 7/2014 | Nemat-Nasser ....... G08B 21/06 340/575 |
| 2014/0300738 A1* | 10/2014 | Mueller ................. B60R 11/04 348/148 |
| 2014/0316659 A1* | 10/2014 | Lee ................... B60R 21/01538 701/45 |

FOREIGN PATENT DOCUMENTS

| | | |
|---|---|---|
| WO | WO-2005/021314 A1 | 3/2005 |
| WO | WO-2014/077190 A1 | 5/2014 |

OTHER PUBLICATIONS

Written Opinion of the ISA for PCT/EP2015/080069, ISA/EP, Rijswijk, NL, dated Apr. 7, 2016.

* cited by examiner

ASSISTANCE MODULE FOR THE STEERING WHEEL OF A VEHICLE

CROSS-REFERENCE TO RELATED APPLICATIONS

This application is a 371 U.S. National Stage of International Application No. PCT/EP2015/080069, filed on Dec. 16, 2015, which claims the benefit of and priority to French Patent Application No. 1463130, filed on Dec. 22, 2014. The entire disclosures of the above applications are incorporated herein by reference.

FIELD

The present invention relates in a general manner to a vehicle steering wheel and in particular to a steering wheel for a vehicle equipped with a driver surveillance camera in order to detect, for example, any drowsiness of the driver. It can be advantageous with such a system to provide a source of infrared radiation in the vehicle designed to illuminate the driver in order to guarantee a suitable illumination of the driver independently of the luminosity in the vehicle cabin.

BACKGROUND

It is known in the prior art that such a source of infrared radiation (an infrared light-emitting diode, for example) can be integrated in a steering wheel such as the one disclosed in the document WO2014077190. On the other hand, this system has in particular the disadvantage of making the steering wheel structure more complex, of imposing significant design constraints and of destandardising it.

DISCUSSION

A goal of the present invention is to respond to the disadvantages of the prior art cited above and in particular, first of all, to propose a vehicle steering wheel with which the insertion of a source of infrared radiation does not render its structure complex.

To this end, a first aspect of the invention relates to a driver assistance module designed to be fixed on a steering wheel of an automobile comprising a first driver information device, characterized in that the assistance module furthermore comprises a source of infrared radiation designed to illuminate the driver and which forms part of a second information device.

The steering wheel equipped with a module according to the above implementation remains standard in its structure because the source of infrared radiation is supported by the assistance module, which is primarily dedicated to a first function for information and is attached to the steering wheel. In other words, the invention limits the complexity because the first device is different and distinct from the second device but supports its source of infrared radiation, which must be on the steering wheel. The first device does not use components of the second device and the second device only uses the assistance module as support for its source of infrared radiation because the two devices are distinct and do not have the same function. Aside from the source of infrared radiation, the first device cannot have any component in common with the second device.

Due to this fact, only the assistance module is specific when the infrared illumination function for the conductor must be added to the vehicle. The source of infrared radiation can be an infrared light-emitting diode and designed to emit an infrared radiation whose wavelength can be comprised between 0.78 µm and 5 mm.

Finally, it should be noted that the assistance module initially conceived to be part of a first information device (relative, for example, to the control of the car radio of the vehicle) becomes multifunctional and forms part of a second driver information device concerning his vigilance (of which the infrared radiation source and the infrared camera form a part). These information devices are not necessarily completely integrated solely onto the steering wheel but can also be arranged on other parts of the vehicle.

The first information device advantageously comprises:
a source of visible radiation,
at least one first wall formed by at least one material which can be at least partially traversed by a visible radiation emitted by the source of visible radiation, and
at least one second wall formed by at least one material which can be at least partially traversed by an infrared radiation emitted by the infrared radiation source. This implementation allows the simplification of the integration of the infrared light source and renders this integration more discreet.

The first information device advantageously comprises:
a source of visible radiation,
a third wall formed by at least one material which can be at least partially traversed by a visible radiation emitted by the source of visible radiation and by an infrared radiation emitted by the infrared radiation source. In this implementation the part of the wall which can transmit the visible light is also arranged facing the infrared radiation source, that is, between the latter and the driver to be illuminated. It can then be understood that the outer aspect of the assistance module is the same with or without the infrared radiation source. It is possible, for example, to arrange the infrared radiation source under a surface which allows a night backlighting to pass such as a sign on a touch button placed on the steering wheel, the car radio control or the speed regulator.

The first information device advantageously comprises a source of visible radiation.

The assistance module advantageously comprises at least one electronic card supporting the infrared radiation source and the source of visible radiation. The structure of the assistance module is provided to support the infrared radiation source, which simplifies the design: it is sufficient to connect an infrared source on the electronic card when the infrared option is to be provided.

The infrared radiation source and the source of visible radiation advantageously form part of the same electrical circuit. In fact, the infrared radiation source and the source of visible radiation are both useful when the luminosity is low. A simultaneous feeding of the two sources allows the simplification of the cabling in the vehicle since a specific cable for feeding the infrared source is no longer necessary.

The assistance module advantageously comprises a wall covering the source of infrared radiation and which is formed by at least one material which can be at least partially traversed by an infrared radiation emitted by the infrared radiation source.

The wall is advantageously mobile relative to the steering wheel in such a manner as to be able to activate at least one command means of the vehicle. According to this implementation, the wall is typically the external wall of a command button (connected to or forming part of the first information device) placed on the vehicle, for example of the car radio, of the speed regulator, of the telephone or of the horn.

A second aspect of the invention relates to an automobile steering wheel comprising at least one assistance module according to the first aspect of the invention.

A third aspect of the invention relates to an automobile comprising at least one steering wheel according to the second aspect of the invention and/or at least one assistance module according to the first aspect of the invention.

BEST DESCRIPTION OF THE DRAWINGS

Other characteristics and advantages of the present invention will appear more clearly from a reading of the following detailed description of an embodiment of the invention given by way of a non-limiting example and illustrated by the attached drawings in which.

DETAILED DESCRIPTION

Figure 1:
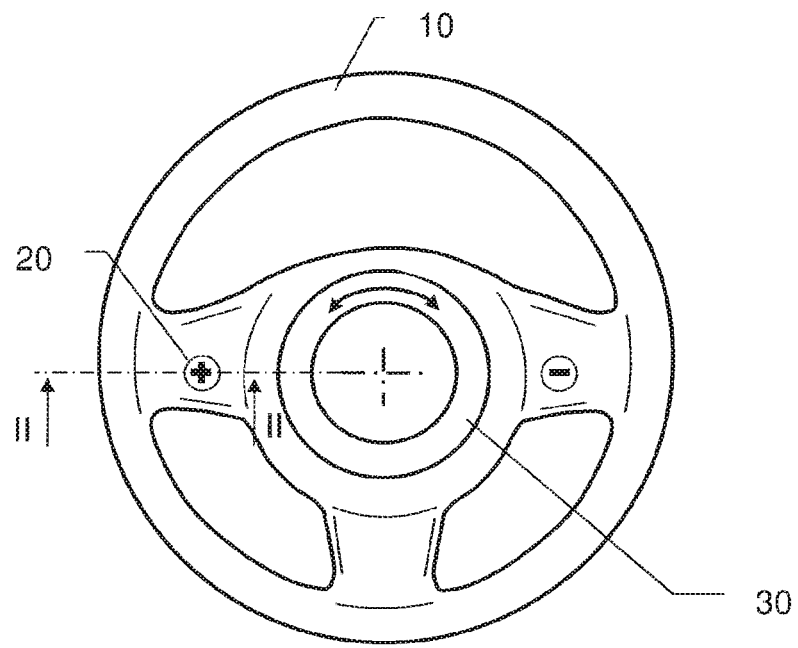
FIG. 1 shows a general view of a vehicle steering wheel equipped with assistance modules according to the present invention.

FIG. 1 shows a vehicle steering wheel comprising a rim 10 connected to a hub 30 by three spokes. Driver assistance modules 20, that is, buttons for regulating the sound volume of the car radio of the vehicle, are arranged on two of the steering wheel spokes. These assistance modules send visual information to the driver either in the form of signs or in the form of luminous signals.

The assistance module 20 on the left is the button to actuate for increasing the sound volume and the assistance module (20) on the right is the button to actuate to reduce the sound volume. To this end, each button has a sign for informing the driver, respectively "+" and "−" for each assistance module.

In order to indicate the function and the positioning of each assistance module 20 to the driver and even at night, the buttons are provided with a backlighting and in particular via the surface of the "+" and "−" signs, which is rendered translucid or transparent and a source of visible light is arranged under the translucid or transparent part of the outer wall of the buttons.

Figure 2:
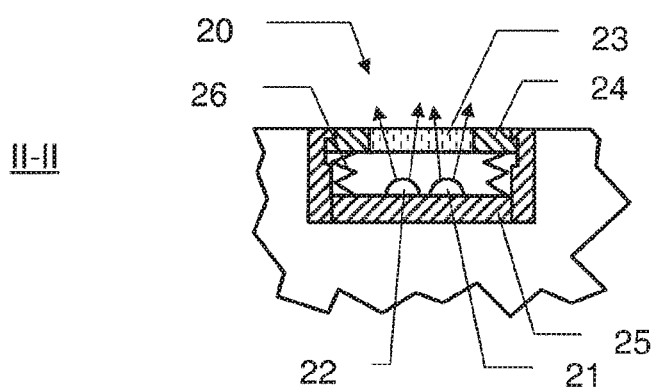
FIG. 2 shows a sectional view of one of the assistance modules of the steering wheel of FIG. 1.

FIG. 2 shows a section of the left assistance module of the steering wheel shown in FIG. 1 along the axis II-II of this figure.

The outer wall of the assistance module 20 comprises a translucid part 23 (which allows the visible light to pass) and an opaque part 24 in order to delimit the "+" sign. This outer wall can be moved to allow the regulating of the sound volume to be controlled and elastic means 26 are provided to exert a return force on the outer wall.

The latter is set in a box supported by an electronic card 25 which supports a visible source of radiation 22, an light-emitting diode, for example. The term visible radiation denotes a radiation whose wavelength is comprised between 0.39 μm and 0.78 μm, terminals included.

When the vehicle is equipped with an infrared camera for detecting a possible drowsiness of the driver, it is advantageous to provide an infrared radiation source 21 in order to guarantee the acquisition by camera of images which can be subsequently treated in a satisfactory manner.

The present invention proposes adding this infrared radiation source 21 (with a wavelength comprised between 0.78 μm and 5 mm, terminals included) to the assistance module 20. The using of an infrared light-emitting diode can be envisaged.

The infrared radiation source 21 is mounted on the same electronic card 25 as the visible radiation source 22 and it also faces the translucid part 23, which allows the driver to be illuminated, because this translucid part 23 is permeable to the infrared radiations.

Of course, it is possible in a general manner to envisage moving the visible source of radiation 22 and the infrared radiation source 21 from the translucid wall by using one or more light guides (or infrared radiation guides). This allows degrees of freedom to be given to the designer in order to arrange other components in the steering wheel.

Consequently, the assistance module 20 has the same outer aspect whether it is equipped or not with the infrared radiation source 21 and the general structure of the steering wheel is not affected by this option.

CLAIMS

It is understood that various modifications and/or improvements obvious to a person skilled in the art can be added to the various embodiments of the invention described in the present description without departing from the framework of the invention defined by the attached claims.

The invention claimed is:

1. A multi-functional, driver assistance module in combination with a steering wheel of a vehicle, the driver assistance module comprising:
   a first driver information device; and
   an infrared radiation source arranged to illuminate the driver and forming part of a second driver information device,
   wherein the first driver information device comprises:
   a source of visible radiation; and
   at least one wall
   wherein the multi-functional, driver assistance module is fixed on the vehicle steering wheel and provides dual functions of illuminating the driver with the infrared radiation source and providing the visible radiation from the source of visible radiation
   wherein the at least one wall is movable relative to the steering wheel for activating at least one command means of the vehicle.

2. A multi-functional, driver assistance module in combination with a vehicle steering wheel, the driver assistance module comprising:
   a first driver information device; and
   an infrared radiation source arranged to illuminate the driver and forming part of a second driver information device, wherein the first driver information device further comprises:
   a source of visible radiation; and
   at least one electronic card supporting the infrared radiation source and the visible radiation source,
   wherein the multi-functional, driver assistance module is fixed on the vehicle steering wheel and provides dual functions of illuminating the driver with the infrared radiation source and providing the visible radiation from the source of visible radiation, and
   wherein the infrared radiation source and the visible radiation are both generated from within a common box fixed to the vehicle steering wheel.

3. The multi-functional, driver assistance module according to claim 1, wherein the infrared radiation source and the visible radiation source form part of the same electrical circuit.

4. The multi-functional, driver assistance module and steering wheel of claim 1, in combination with the vehicle.

5. A multi-functional driver assistance module designed to be fixed on a steering wheel of a vehicle, the driver assistance module comprising:

a box associated with an electronic card;

a first driver information device configured to actively receive input from a passenger of the vehicle, the first driver information device including a visible radiation source; and a second driver information device including an infrared radiation source arranged to illuminate a driver of the vehicle and configured to passively receive information concerning the driver;

wherein the electronic card supports both the infrared radiation source and the visible radiation source such that the infrared radiation source and the visible radiation source both generated from within the box.

6. The multi-functional, driver assistance module of claim 5, in combination with the vehicle steering wheel, the box fixed to the vehicle steering wheel.

7. The multi-functional, driver assistance module and steering wheel of claim 6, in combination with the vehicle.

8. The multi-functional, driver assistance module and steering wheel of claim 1, wherein the at least one wall is formed by at least one material at least partially traversable by a visible radiation emitted by the source of visible radiation and partially traversed by an infrared radiation emitted by the infrared radiation source.

9. The multi-functional, driver assistance module and steering wheel of claim 2, wherein the first driver information device further comprises a wall formed by at least one material which can be at least partially traversed by a visible radiation emitted by the source of visible radiation and by an infrared radiation emitted by the infrared radiation source.

* * * * *